United States Patent [19]

Kim et al.

[11] Patent Number: 5,675,608
[45] Date of Patent: Oct. 7, 1997

[54] SYNCHRONOUS TRANSMITTER AND RECEIVER OF SPREAD SPECTRUM COMMUNICATION METHOD

[75] Inventors: Je-Woo Kim, Suwon; Sung-Hun Jung, Seoul, both of Rep. of Korea

[73] Assignee: SamSung Electronics Co., Ltd., Suwon, Rep. of Korea

[21] Appl. No.: 492,321

[22] Filed: Jun. 19, 1995

[30] Foreign Application Priority Data

Jun. 17, 1994 [KR] Rep. of Korea ............... 13767/1994

[51] Int. Cl.[6] ...................................................... H04K 1/00
[52] U.S. Cl. ........................................... 375/208; 370/208
[58] Field of Search .................................. 375/200, 206, 375/208, 279, 308, 329; 370/208; 364/717; 327/164

[56] References Cited

U.S. PATENT DOCUMENTS

| | | | |
|---|---|---|---|
| 4,214,209 | 7/1980 | Baier et al. | 375/367 |
| 4,327,438 | 4/1982 | Baier et al. | 375/208 |
| 4,575,861 | 3/1986 | Levreault | 375/200 |
| 5,103,459 | 4/1992 | Gilhousen et al. | 375/206 |
| 5,111,478 | 5/1992 | McDonald | 375/200 |
| 5,245,612 | 9/1993 | Kachi et al. | 370/324 |
| 5,400,359 | 3/1995 | Hikoso et al. | 375/202 |
| 5,414,728 | 5/1995 | Zehavi | 375/200 |
| 5,416,797 | 5/1995 | Gilhousen et al. | 375/205 |
| 5,471,497 | 11/1995 | Zehavi | 375/200 |
| 5,488,629 | 1/1996 | Takahashi et al. | 375/206 |
| 5,511,073 | 4/1996 | Padovani et al. | 375/206 |
| 5,559,790 | 9/1996 | Yano et al. | 370/208 |

*Primary Examiner*—Tesfaldet Bocure
*Attorney, Agent, or Firm*—Robert E. Bushnell, Esq.

[57] ABSTRACT

A synchronous transmitter and receiver utilizing a spread spectrum communication method includes a pseudo noise code generator for generating a preset pseudo noise (PN) code; a spectrum spreading device for band-spreading input data in accordance with a pseudo noise code; a modulator for modulating an intermediate frequency signal to an in-phase and a quadrature phase by means of the pseudo noise code and spread spectrum data according to a quadrature phase shift keying modulation method; and a transmitter for transmitting a carrier wave modulated by the modulated signal.

24 Claims, 4 Drawing Sheets

SYNCHRONOUS TRANSMITTER AND RECEIVER OF SPREAD SPECTRUM COMMUNICATION METHOD

CROSS-REFERENCE TO RELATED APPLICATIONS

This application makes reference to, incorporates the same herein, and claims all benefits accruing under 35 U.S.C. §119 from an application for Synchronous Transmitter And Receiver Of Spread Spectrum Communication Method earlier filed in the Korean Industrial Property Office on 17 Jun. 1994 and assigned Ser. No. 13767/1994.

BACKGROUND OF THE INVENTION

The present invention relates to a communication system for a spread spectrum communication method using a pseudo noise (PN) code, and more particularly to a synchronous transmitter and receiver utilizing synchronous detection when original data is recovered on the receiving side.

Conventionally, narrow band modulation systems (such as for example, amplitude modulation, frequency modulation and binary phase shift keying) have been used in the field of data communication. With such systems, demodulation at the receiver can be achieved with a relatively small amount of generally simple circuitry. Such systems, however, are somewhat unreliable due to their susceptibility to multipath fading and narrow band noise.

By contrast, in spread spectrum communication systems, a data spectrum is spread with pseudo noise code before transmission on the transmitting side, while the pseudo noise code and the data are synchronized after reception on the receiving side so that the adverse effects of multipath fading and narrow band noise can be minimized. Accordingly, spread spectrum communication systems have attracted increased attention as a promising technique for radio frequency transmission of binary data.

One exemplar of the recent effort attempting to provide a spread spectrum communication system is mentioned in U.S. Pat. No. 5,400,359 entitled Spread Spectrum Communication System And An Apparatus For Communication Utilizing This System issued to Hikoso et al. on 21 Mar. 1995. In Hikoso et al. '359, a pseudo noise code is generated and multiplied by data to generate a multiplied result which is then subjected to binary phase shift keying (BPSK) modulation. The pseudo noise code is delayed by at least one chip of the pseudo noise code, combined with a modulated signal, converted into a radio frequency (RF) signal, and transmitted from an antenna. The transmitted signal is received at a receiving end where a complementary receiving method is provided. While recent art, such as Hikoso et al. '359, strives to provide an improvement over the conventional narrow band techniques, we have found that contemporary transmitter and receiver designs fail to accurately reproduce the intermediate frequency and do not provide the best use of spread spectrum techniques.

SUMMARY OF THE INVENTION

Accordingly, it is an object of the present invention to provide an improved synchronous transmitter and receiver.

It is another object to provide a synchronous transmitter and receiver capable of reliably recovering binary data by accurately detecting an intermediate frequency.

It is still another object to provide a synchronous transmitter and receiver capable of accurately detecting an intermediate frequency with a simple circuit.

It is yet another object to provide synchronous transmitter and receiver circuits effectively eliminating self-interference attributable to intermediate frequency.

These and other objects can be achieved according to the principles of the present invention with a synchronous transmitter and receiver using a spread spectrum communication technique. The synchronous transmitter and receiver constructed according to the principles of the invention contemplate a pseudo noise code generator for generating a preset pseudo noise (PN) code, a spectrum spreading device for band-spreading input data in accordance with a pseudo noise code, and a modulator for providing an intermediate frequency signal modulated to an in-phase and a quadrature phase with the pseudo noise code and spread spectrum data according to a quadrature phase shift keying modulation technique. A transmitter then transmits a carrier wave modulated with the modulated signal.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
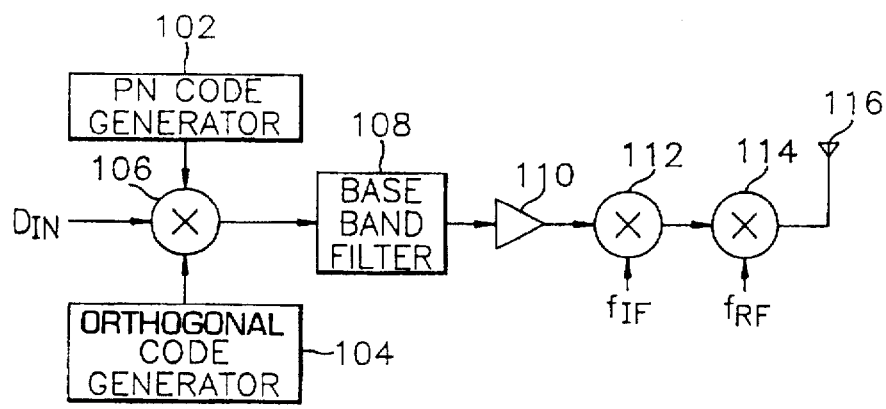
FIG. 1 is a block diagram showing the construction of a synchronous transmitter using a conventional spread spectrum communication technique.
Figure 2:
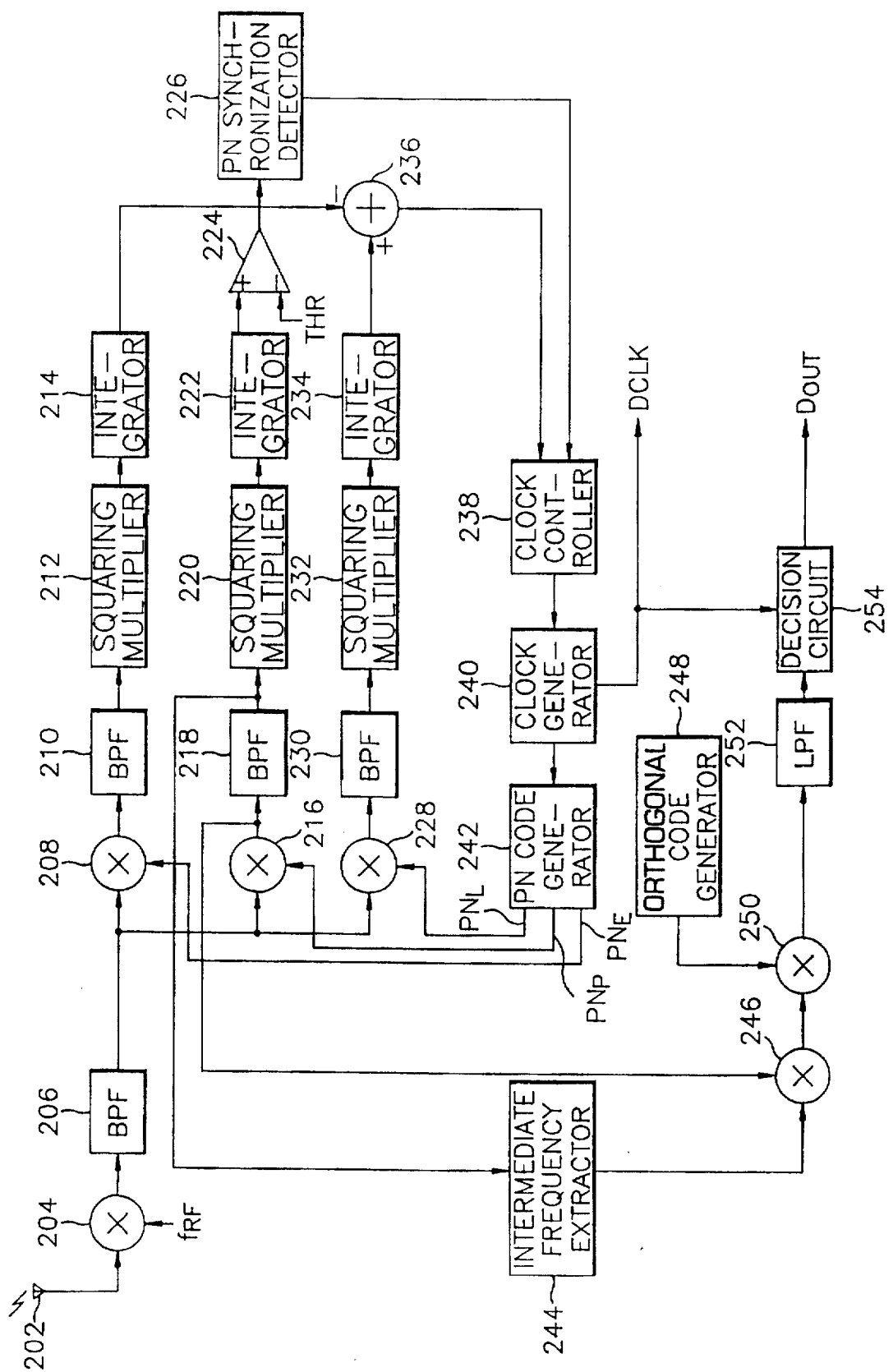
FIG. 2 is a block diagram showing the construction of a synchronous receiver using a conventional spread spectrum communication technique.

Turning now to the drawings and referring to FIGS. 1 and 2, a synchronous transmitter and receiver using a conventional spread spectrum communication technique are illustrated.

In the transmitter represented by the schematic diagram shown in FIG. 1, input data $D_{IN}$ is spread with a pseudo noise code generated by a pseudo noise code generator 102 and modulated with an orthogonal code of an orthogonal code generator 104 in mixer 106. This spread and modulated version of input data $D_{IN}$ is then base band filtered through a base band filter 108 for band-width limitation, amplified by amplifier 110, and successively modulated with an intermediate frequency $f_{IF}$ and a carrier wave $f_{RF}$ in mixers 112 and 114, respectively. The output from mixer 114 is then transmitted through an antenna 116.

In the receiver represented by the schematic diagram shown in FIG. 2, a signal received through an antenna 202 is multiplied by carrier wave $f_{RF}$ in a mixer 204, and is then filtered to an intermediate frequency band through a band pass filter (BPF) 206. The band pass filtered signal provided by band pass filter 206 is multiplied by an early pseudo noise code $PN_E$, a punctual pseudo noise code $PN_P$, and a late pseudo noise code $PN_L$ generated by pseudo noise code generator 242, in mixers 208, 216, and 228, respectively. The products provided by mixers 208, 216, and 228 are, respectively filtered through band pass filters 210, 218 and 230, squared by squaring multipliers 212, 220, and 232, and integrated by integrators 214, 222, 234 for a period of time corresponding to a pseudo noise code sequence in order to detect the envelopes of the respective output signals. Comparator 224 compares the envelope of the output signal from the punctual pseudo noise loop provided by integrator 222 with a reference threshold voltage THR. If the magnitude of the envelope of the punctual pseudo noise loop is greater than reference threshold voltage THR, pseudo noise synchronization is maintained at the initial synchronization. On the contrary, if the envelope is less than reference threshold voltage THR, an operation for adjusting the initial synchronization is repeatedly performed by driving clock controller 238 with the output signal generated by pseudo noise synchronization detector 226 and the difference between the output signals derived by subtractor 236 in response to the envelopes of the late pseudo noise loop and the early pseudo noise loop. The early pseudo noise code $PN_E$ generated in pseudo noise code generator 242 is faster than the punctual pseudo noise code $PN_P$ by a period of one-half chip and the late pseudo noise code $PN_L$ is slower than the punctual pseudo noise code $PN_P$ by a period of one-half chip.

An output signal from band pass filter 218 of the punctual loop is provided as an input to an intermediate frequency extractor 244 which extracts the intermediate frequency from the signal passed by band pass filter 218. An output from intermediate frequency extractor 244 is multiplied in mixer 246 by a despread signal from mixer 216, and is multiplied in mixer 250 by the orthogonal code from an orthogonal code generator 248. The original data $D_{OUT}$ is then recovered through a low pass filter (LPF) 252 and a decision circuit 254.

The capacity of the synchronous transmitter and receiver using this spread spectrum technique depends on how accurately the synchronization of the pseudo noise code and the intermediate frequency is recovered.

We have found that it is difficult to regenerate the intermediate frequency because the intermediate frequency is band-spread with data by the pseudo noise code in the receiver and that therefore, the receiver should have an intermediate frequency regenerator, rather than a pseudo noise synchronization circuit.

Figure 3A:
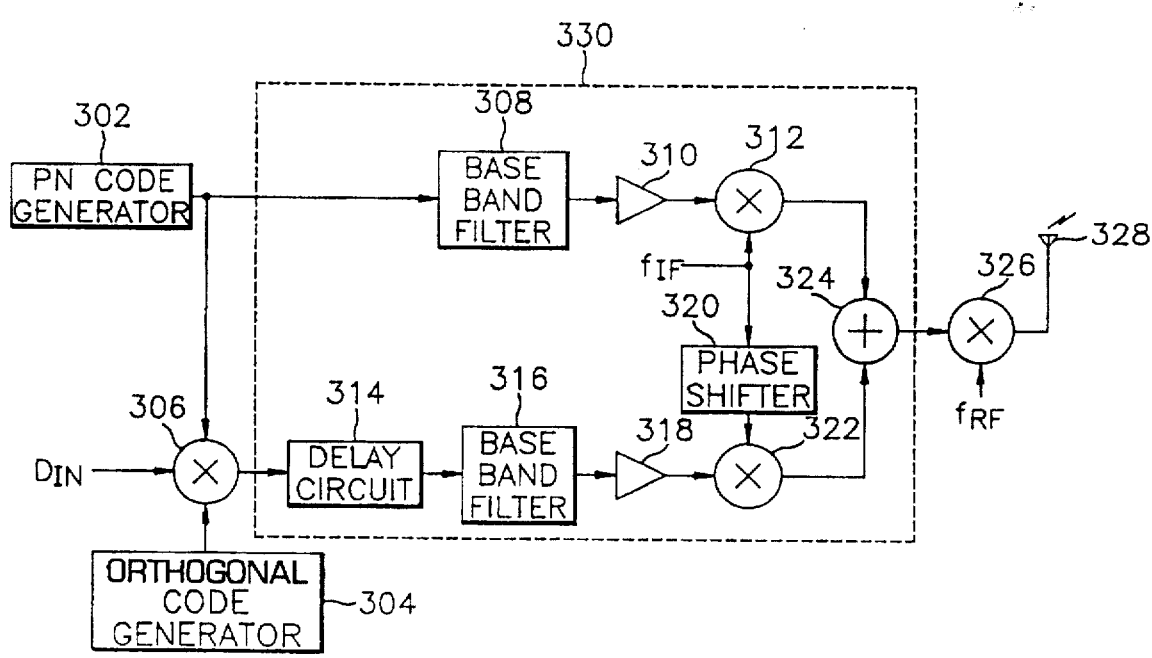
FIG. 3A is a block diagram showing the construction of a synchronous transmitter using a spread spectrum communication technique according to the principles of the present invention.
Figure 3B:
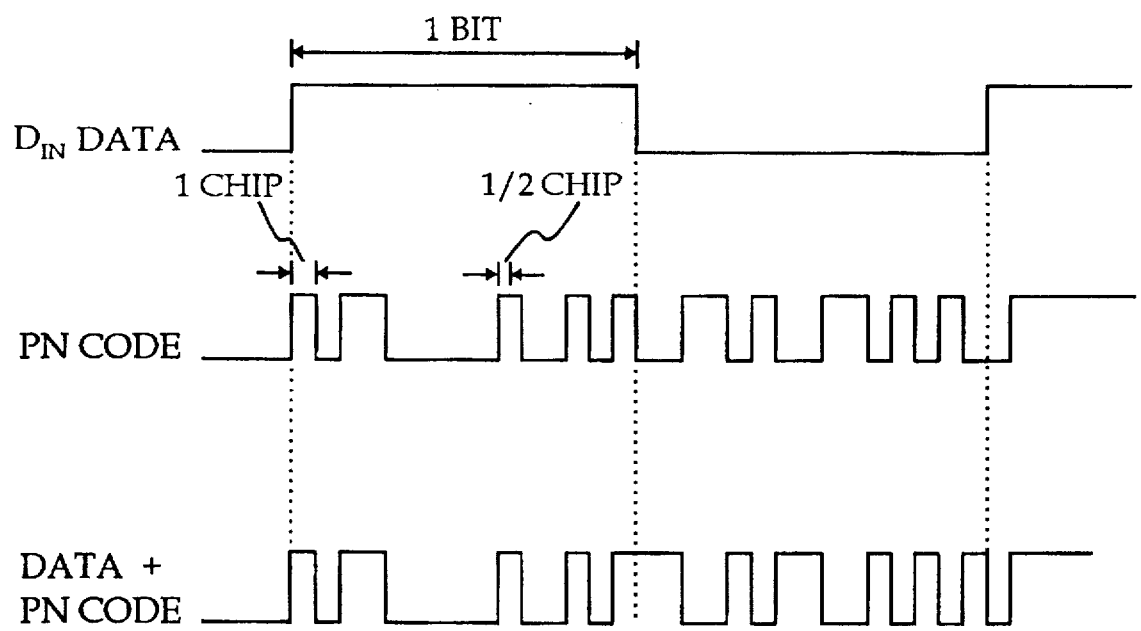
FIG. 3B is a schematic diagram showing a relationship between data and the pseudo noise code in the practice of the present invention.

FIG. 3A is a block diagram schematic diagram showing a synchronous transmitter utilizing a spread spectrum communication technique constructed according to the principles of the present invention. This transmitter has a pseudo noise code generator 302 for generating a preset pseudo noise code; an orthogonal code generator 304 for generating a preset orthogonal code; a mixer 306 for band-spreading the input data $D_{IN}$ with the pseudo noise code (see FIG. 3B for an illustration exemplifying the relationship between input data $D_{IN}$ and the pseudo noise code) and orthogonal-coding the input data $D_{IN}$ with the orthogonal code provided by generator 304. Modulating circuit 330 applies the pseudo noise code and the spread spectrum data to perform an offset quadrature phase shift keying (OQPSK) operation upon an intermediate frequency signal $f_{IF}$. Mixer 326 modulates a carrier wave $f_{RF}$ with the output signal generated by modulating circuit 330 and transmitting the modulated carrier wave signal is transmitted through an antenna 328 to provide a radio frequency broadcast.

As shown in FIG. 3A, modulating circuit 330 has a base band filter 308 for limiting the band of the pseudo noise code to a base band, an amplifier 310 for amplifying the band-limited pseudo noise code passed via filter 308, a mixer 312 multiplying an output of amplifier 310 with intermediate frequency signal $f_{IF}$. Delay circuit 314 delays the output of mixer 306 by a time period corresponding to one half chip of the pseudo noise code (i.e., one half chip refers to one half of the length of one pulse of the pseudo noise code—see FIG. 3B), a base band filter 316 limits the band of the delayed data to a base band. Amplifier 318 amplifies the band-limited data, a phase shifter 320 shifts the phase of intermediate frequency signal $f_{IF}$ by 90 degrees, mixer 322 multiplies an output of amplifier 318 by the phase shifted intermediate frequency signal, and an adder 324 adds outputs signals from mixers 312 and 322 and applies the added output signals to a mixer 326.

Figure 4:
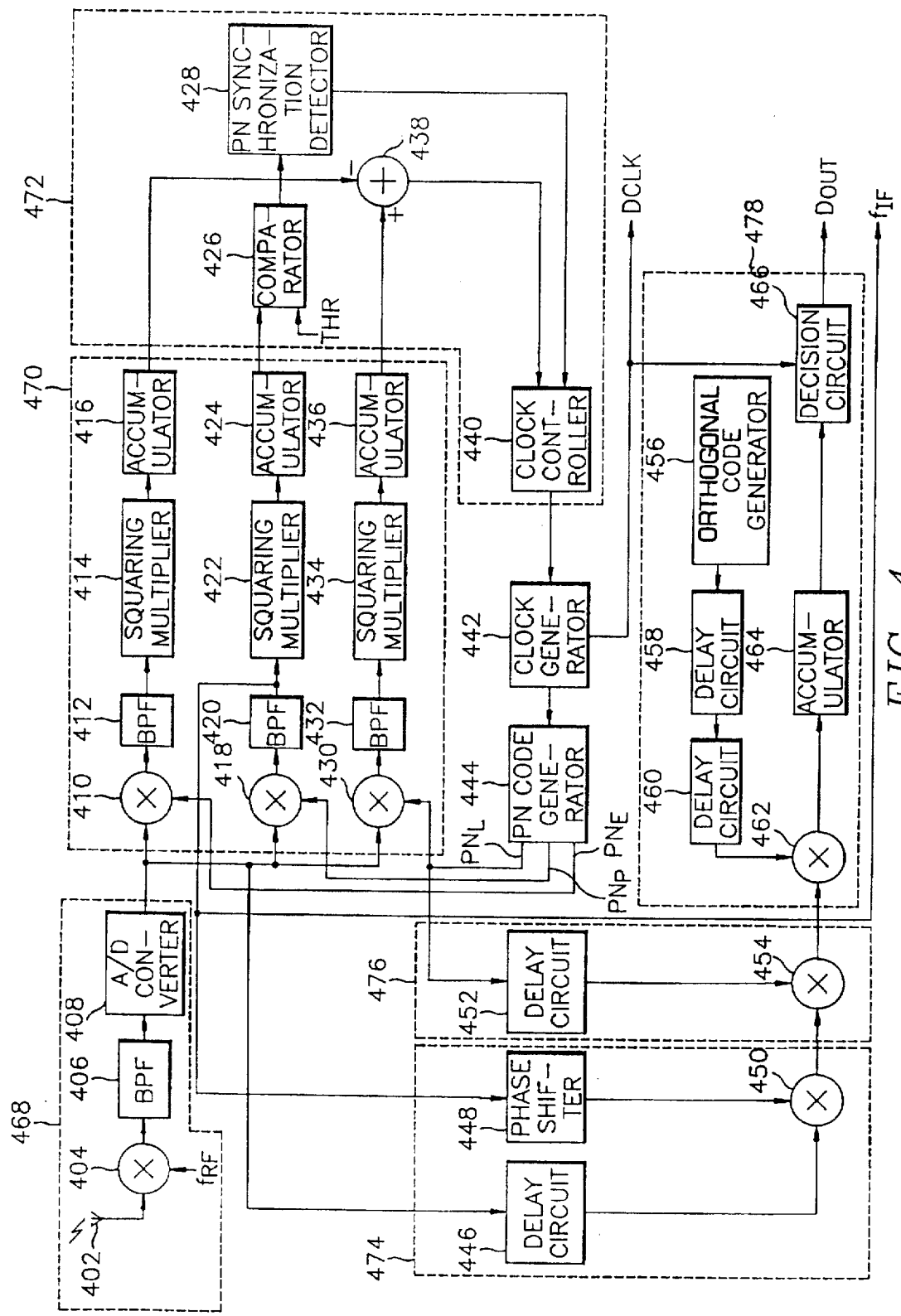
FIG. 4 is a block diagram showing the construction of a synchronous receiver using a spread spectrum communication technique according to the principles of the present invention.

FIG. 4 is a block diagram schematic showing a synchronous receiver utilizing a spread spectrum communication technique according to the principles of the present invention. The receiver shown in FIG. 4 is comprised of a receiving circuit 468 for receiving a signal from a transmitting side and eliminating the carrier wave from the received signal in order to extract an intermediate frequency band signal. Clock generator 442 generates a data clock signal DCLK, together with a clock signal synchronized with the pseudo noise code of the received signal. Pseudo noise code generator 444 provides a punctual pseudo noise code $PN_P$, an early pseudo noise code $PN_E$, and a late pseudo noise code $PN_L$ from the synchronized clock signal of clock generator 442. In the practice of the present invention, the early pseudo noise code $PN_E$ generated in pseudo noise code generator 444 is faster than the punctual pseudo noise code $PN_P$ by a period of one-half chip and the late pseudo noise code $PN_L$ is slower than the punctual pseudo noise code $PN_P$ by a period of one-half chip. Envelope detecting circuit 470 despreads the intermediate frequency band signal by means of the early, punctual, and late pseudo noise codes $PN_E$, $PN_P$, and $PN_L$ and extracts an in-phase component of the intermediate frequency band to thereby detect each envelope. Clock controlling circuit 472 controls clock generator 442 according to the level of the detected envelope and establishes initial synchronization for the pseudo noise code to thereby maintain the synchronization. Quadrature phase extracting circuit 474 converts an in-phase component of the intermediate frequency band into a quadrature phase component thereof, and eliminates the intermediate frequency component from the intermediate frequency band signal to extract the quadrature phase component. Despreading circuit 476 despreads the quadrature phase component by the late pseudo noise code $PN_L$ and data recovery circuit 478 provides a decoded signal component by orthogonally-decoding the despread quadrature phase component, synchronizing the decoded despread quadrature phase component with the data clock signal DCLK and accumulates the decoded signal component for a period of time corresponding to the pseudo noise code sequence in order to recover the original data.

Receiving circuit 468 has a mixer 404, a band pass filter (BPF) 406, and an analog/digital (A/D) converter 408. Envelope detecting circuit 470 uses a parallel path array formed by mixers 410, 418, 430, band pass filters (BPFs) 412, 420, 432, squaring multipliers 414, 422, 434, and accumulators 416, 424, 436. Clock controlling circuit 472 has of a comparator 426, a pseudo noise synchronization detector 428, a subtracting circuit 438 and a clock controller 440. Quadrature phase extracting circuit 474 uses a delay circuit 446 for delaying the intermediate frequency band signal during the extraction of the in-phase component from envelope detecting circuit 470, a phase shifter 448 for shifting the phase of the in-phase component of the intermediate frequency band by 90 degrees, and a mixer 450 for multiplying an output of phase shifter 448 by an output of delay circuit 446 to eliminate an intermediate frequency component.

Despreading circuit 476 has a delay circuit 452 for delaying the late pseudo noise code $PN_L$ for a time period corresponding to the extraction of the in-phase component in envelope detecting circuit 470, and a mixer 454 for multiplying an output of mixer 450 by an output of delay circuit 452 in order to despread the multiplied output.

Data recovering circuit 478 has an orthogonal code generator 456 for generating the orthogonal code, a delay circuit 458 for delaying the orthogonal code by one half chip of the pseudo noise code, a delay circuit 460 for delaying an output of delay circuit 458 during the extraction of the in-phase component from envelope detecting circuit 470, a mixer 462 for multiplying an output of mixer 454 by an output of delay circuit 460 and orthogonally-decoding the multiplied output, an accumulator 464 for accumulating the output signal from mixer 462, and a decision circuit 466 for receiving data clock signal DCLK from clock generator 442 and deciding upon a data value by making a comparison of an accumulated value with a preset value for each period of the pseudo noise code sequence, in order to thereby recover the original data.

The operations of the embodiments of the transmitter and receiver represented in FIGS. 3A and 4 will now be described in detail. In accordance with the principles of the present invention, by adding a pilot channel with only the pseudo noise code to the data modulating channel, it is possible to accurately detect the intermediate frequency through the despreading of the pseudo noise code in the receiver. This makes it possible to accurately recover reliable data. This results in elimination of self-interference by the intermediate frequency and a concomitant achievement of automatic gain control (AGC).

In the transmitter shown in FIG. 3A, input data $D_{IN}$ enters mixer 306 and is band-spread by the pseudo noise code of pseudo noise generator 302 (see FIG. 3B for an illustration exemplifying the relationship between input data $D_{IN}$ and the pseudo noise code), and orthogonally-coded by the orthogonal code of orthogonal code generator 304. In order to perform the offset quadrature phase shift key operation, input data $D_{IN}$ is delayed by a period of one-half chip of the pseudo noise code through delay circuit 314, filtered through base band filter 316 for band limitation, and then amplified in amplifier 318. Several advantages are provided from this offset quadrature phase shift keying technique. For example, it is possible to use a class C amplifier having a high degree of effectiveness in this offset quadrature phase shift keying technique because a zero crossing on cancellation does not occur therein. The pseudo noise code of the pilot channel is band-limited in base band filter 308 and then amplified in amplifier 310. After being quadrature-modulated by intermediate frequency $f_{IF}$, the pseudo noise code and the data modulation signal are added in adder 324, and the added signal provided by adder 423 is mixed with carrier wave $f_{RF}$ in mixer 326, and transmitted as a radio frequency signal through antenna 328. At this time, transmission signal $S_T$ is expressed as the following equation 1:

$$S_T = \left\{ [P(t)\cos(2\pi f_{IF})t] + \left[ d\left(t - \frac{Tc}{2}\right) \cdot W\left(t - \frac{Tc}{2}\right) \cdot P\left(t - \frac{Tc}{2}\right) \cdot \sin(2\pi f_{IF})t \right] \right\} e^{2\pi f_{RF}t} \quad (1)$$

where:
- P(t) indicates the pseudo noise code,
- W(t) indicates the orthogonal code, and
- d(t) indicates data.

In the receiver represented by the schematic shown in FIG. 4, mixer 404 mixes the received radio frequency signal broadcast by antenna 328 to eliminate carrier wave $f_{RF}$ from the signal received through antenna 402, and the signal received is filtered into the intermediate frequency band by band pass filter 406. The signal is then converted into a digital format by analog/digital converter 408 and is separately multiplied by early pseudo noise code $PN_E$, punctual pseudo noise code $PN_P$, and late pseudo noise code $PN_L$ in separate corresponding mixers 410, 418, and 430, respectively. The pseudo noise codes are generated in pseudo noise code generator 444. Next, output signals from mixers 410, 418 and 430 are separately respectively filtered by band pass filters 412, 420 and 432, and the envelopes are detected through squaring multipliers 414, 422, and 434 and accumulators 416, 424, and 436 for one period of the pseudo noise code sequence. Comparator 426 then compares the envelope of the punctual loop output from accumulator 424 with reference threshold voltage THR, to thereby determine whether the initial synchronization of the pseudo noise code is properly set. If the initial synchronization of the pseudo noise code is properly set, the synchronization of pseudo noise code generator 444 is maintained through clock controller 440 and clock generator 442. Alternatively, if the comparison made by comparator 426 indicates that the initial synchronization is not properly set, an operation for adjusting the synchronization is repeatedly performed.

An in-phase component of the intermediate frequency is extracted and output from band pass filter 420. The extraction of the in-phase component will now be explained in detail. The signal from which the carrier wave $f_{RF}$ is eliminated in the foregoing equation 1 is expressed in equation 2 as follows.

$$S_T = P(t)\cos(2\pi f_{IF})t + \left\{ d\left(t - \frac{Tc}{2}\right) \cdot W\left(t - \frac{Tc}{2}\right) \cdot P\left(t - \frac{Tc}{2}\right) \cdot \sin(2\pi f_{IF})t \right\} \quad (2)$$

The signal represented in equation 2 is multiplied by punctual pseudo noise code $PN_P$ in mixer 418, with the synchronization of punctual pseudo noise code $PN_P$ continuously being adjusted by pseudo noise code generator 444. The resulting signal is expressed in equation 3 as follows.

$$S_T = \cos(2\pi f_{IF})t + \left\{ d\left(t - \frac{Tc}{2}\right) \cdot W\left(t - \frac{Tc}{2}\right) \cdot P\left(t - \frac{Tc}{2}\right) \cdot P(t)\sin(2\pi f_{IF})t \right\} \quad (3)$$

The signal represented in equation 3 is composed of the in-phase component of the intermediate frequency and the orthogonal component spread by data, the orthogonal code, and the pseudo noise code. Therefore, when the signal passes through band pass filter 420, only the in-phase component of the intermediate frequency is extracted. Band pass filters 412, 420, and 432 utilize a finite impulse response (FIR) type of digital filter, which causes band pass filters 412, 420, and 432 to have a delay corresponding to one-half of the number of taps.

As seen in equation 3, the data to be recovered exists in the quadrature phase channel. Hence, by performing a Hilbert transform on the output signal of band pass filter 420 in phase shifter 448 or by delaying the signal by 90 degrees, the intermediate frequency of the quadrature phase can be obtained with a shift of 90 degrees. Then, the signal represented in equation 2 is delayed for a delay time of band pass filter 420 and in delay circuit 446 and multiplied by the output signal of phase shifter 448 in mixer 450 to eliminate the intermediate frequency component. In the meantime, in consideration of the half chip delay performed in the transmitter during the offset quadrature phase shift keying operation, the orthogonal code of orthogonal code generator 456 is delayed by one half chip in delay circuit 458. In further consideration of the delay of band pass filter 420 and phase shifter 448, the pseudo noise code and the orthogonal code are respectively delayed in delay circuits 452 and 460, and then are multiplied in mixer 462 to thereby recover the original data in decision circuit 466 through accumulator 464. Additionally, the present invention recovers the detected intermediate frequency $f_{IF}$ so as to eliminate the self-interference generated by the intermediate frequency.

As described above, the present invention transmits the pseudo noise code as a pilot channel for synchronization. Accordingly, an advantage is provided in that data is accurately and reliably recovered by the intermediate frequency through despreading of the pseudo noise code in the receiver. It is also possible to eliminate self-interference of the intermediate frequency by accurately detecting the intermediate frequency. Moreover, by using this offset quadrature phase shift keying modulation technique during transmission, it is possible to use a class C amplifier having a high degree of effectiveness since the zero crossing operation is not performed therein and the envelope of the modulation wave is comparatively constant, unlike the simple quadrature phase shift keying method commonly found in contemporary circuits.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments failing within the scope of the appended claims.

What is claimed is:

1. A synchronous transmitter, comprising:

pseudo noise code generating means for generating a pseudo noise code;

orthogonal code generating means for generating an orthogonal code;

means for generating coded spread spectrum data by band-spreading input data in accordance with said pseudo noise code and orthogonally coding said input data in accordance with said orthogonal code;

modulating means for generating a modulated noise signal by modulating an intermediate frequency signal with said pseudo noise code and for generating a data modulated signal by modulating a phase shifted version of said intermediate frequency signal with said coded spread spectrum data; and transmitting means for generating a modulated carrier wave signal by modulating a carrier wave with an output obtained from said modulating means, and for transmitting said modulated carrier wave signal.

2. The synchronous transmitter as claimed in claim 1, wherein said modulating means comprises:

first filtering means for limiting a frequency band of said pseudo noise code to a base band;

first mixing means for multiplying said intermediate frequency signal by an output from said first filtering means to generate said modulated noise signal;

second filtering means for limiting a frequency band of said coded spread spectrum data to said base band;

second mixing means for multiplying said phase shifted version of said intermediate frequency signal by an output from said second filtering means to generate said data modulated signal; and means for combining said modulated noise signal with said data modulated signal to generate said output obtained from said modulating means, and for providing said output obtained from said modulating means to said transmitting means.

3. The synchronous transmitter of claim 1, further comprising delay means for delaying said coded spread spectrum data by a time period corresponding to one-half chip of said pseudo noise code.

4. A synchronous receiver, comprising:

receiving means for receiving an input signal comprised of a pseudo noise code and an intermediate frequency band signal, said receiving means eliminating a carrier wave from said input signal, and extracting said intermediate frequency band signal from said input signal;

clock generating means for generating first and second clock signals, said second clock signal being generated in synchronism with receipt of said pseudo noise code;

pseudo noise code generating means for generating an early pseudo noise code, a punctual pseudo noise code and a late pseudo noise code in dependence upon said second clock signal;

envelope detecting means for despreading said intermediate frequency band signal using said early pseudo noise code, said punctual pseudo noise code, and said late pseudo noise code, extracting an in-phase component of said intermediate frequency band signal and detecting envelopes corresponding to said early, punctual and late pseudo noise codes;

clock controlling means for controlling said clock generating means according to levels of said envelopes detected, and for establishing an initial synchronization for said pseudo noise code;

quadrature phase extracting means for converting said in-phase component of said intermediate frequency band signal into a quadrature phase component of said intermediate frequency band signal, and for eliminating an intermediate frequency component of said intermediate frequency band signal to extract said quadrature phase component of said intermediate frequency band signal;

despreading means for despreading said quadrature phase component of said intermediate frequency band signal using said late pseudo noise code to generate a despread quadrature phase component of said intermediate frequency band signal; and data recovery means for synchronizing said despread quadrature phase component of said intermediate frequency band signal with said first clock signal, and for accumulating said despread quadrature phase component of said intermediate frequency band signal for a period of time corresponding to a sequence of said pseudo noise code to recover data within said input signal.

5. The synchronous receiver as claimed in claim 4, wherein said quadrature phase extracting means comprises:

first delay means for generating a first delayed signal by delaying said intermediate frequency band signal for a time period corresponding to the extraction of said in-phase component of said intermediate frequency band signal by said envelope detecting means;

phase shifting means for generating a phase shifted signal by shifting a phase of said in-phase component of said intermediate frequency band signal; and first mixing means for multiplying said first delayed signal by said phase shifted signal to eliminate said intermediate frequency component of said intermediate frequency band signal.

6. The synchronous receiver as claimed in claim 5, wherein said phase shifting means generates said phase shifted signal by performing a Hilbert transform on said in-phase component of said intermediate frequency band signal to shift the phase of said in-phase component of said intermediate frequency band signal by 90 degrees.

7. The synchronous receiver as claimed in claim 5, wherein said phase shifting means generates said phase shifted signal by delaying said in-phase component of said intermediate frequency band signal to shift the phase of said in-phase component of said intermediate frequency band signal by 90 degrees.

8. The synchronous receiver as claimed in claim 5, wherein said despreading means comprises:

second delay means for generating a second delayed signal by delaying said late pseudo noise code for said time period corresponding to the extraction of said in-phase component of said intermediate frequency band signal by said envelope detecting means; and second mixing means for multiplying an output of said first mixing means by said second delayed signal to despread said output of said first mixing means.

9. A synchronous network using a spread spectrum communication method, comprising:

a transmitter comprising:
pseudo noise code generating means for generating a preset pseudo noise code;
orthogonal code generating means for generating a preset orthogonal code;
means for generating coded spread spectrum data by band-spreading input data in accordance with said preset pseudo noise code and orthogonally coding said input data in accordance with said preset orthogonal code;
modulating means for generating a modulated noise signal by modulating an intermediate frequency band signal with said preset pseudo noise code and for generating a data modulated signal by modulating a phase shifted version of said intermediate frequency band signal with said coded spread spectrum data;

means for generating a combined signal by combining said modulated noise signal with said data modulated signal;
transmitting means for generating a modulated carrier wave signal by modulating a carrier wave with said combined signal, and for transmitting said modulated carrier wave signal to a receiver;

said receiver comprising:
means for receiving said modulated carrier wave signal transmitted from said transmitting means, and for eliminating said carrier wave from said modulated carrier wave signal to extract said intermediate frequency band signal;
clock generating means for generating first and second clock signals, said second clock signal being generated in synchronism with said preset pseudo noise code received as a component of said modulated carrier wave signal;
pseudo noise code generating means for generating an early pseudo noise code, a punctual pseudo noise code and a late pseudo noise code in dependence upon said second clock signal;
envelope detecting means for despreading said intermediate frequency band signal using said early pseudo noise code, said punctual pseudo noise code, and said late pseudo noise code, extracting an in-phase component of said intermediate frequency band signal and detecting envelopes corresponding to said early, punctual and late pseudo noise codes;
clock controlling means for controlling said clock generating means according to levels of said envelopes detected, and for establishing an initial synchronization for said preset pseudo noise code;
quadrature phase extracting means for converting said in-phase component of said intermediate frequency band signal into a quadrature phase component of said intermediate frequency band signal, and for eliminating an intermediate frequency component of said intermediate frequency band signal to extract said quadrature phase component of said intermediate frequency band signal;
despreading means for despreading said quadrature phase component of said intermediate frequency band signal using said late pseudo noise code to generate a despread quadrature phase component of said intermediate frequency band signal; and
data recovery means for synchronizing said despread quadrature phase component of said intermediate frequency band signal with said first clock signal, and for accumulating said despread quadrature phase component of said intermediate frequency band signal for a period of time corresponding to a sequence of said preset pseudo noise code to recover said input data.

10. The synchronous network as claimed in claim 9, wherein said modulating means comprises:

first filtering means for limiting a frequency band of said preset pseudo noise code to a base band;
first mixing means for multiplying said intermediate frequency band signal by an output from said first filtering means to generate said modulated noise signal;
second filtering means for limiting a frequency band of said coded spread spectrum data to said base band;
first phase shifting means for shifting a phase of said intermediate frequency band signal by 90 degrees to generate said phase shifted version of said intermediate frequency band signal; and second mixing means for multiplying said phase shifted version of said intermediate frequency band signal by an output from said second filtering means to generate said data modulated signal.

11. The synchronous network as claimed in claim 10, wherein said quadrature phase extracting means comprises:
   first delay means for delaying said intermediate frequency band signal for a time period corresponding to the extraction of said in-phase component of said intermediate frequency band signal by said envelope detecting means;
   second phase shifting means for shifting a phase of said in-phase component of said intermediate frequency band signal by 90 degrees; and
   third mixing means for multiplying an output of said second phase shifting means by an output of said first delay means to eliminate said intermediate frequency component of said intermediate frequency band signal.

12. The synchronous receiver as claimed in claim 11, wherein said despreading means comprises:
   second delay means for delaying said late pseudo noise code for said time period corresponding to the extraction of said in-phase component of said intermediate frequency band signal by said envelope detecting means; and
   fourth mixing means for multiplying an output of said third mixing means by an output of said second delay means to despread said output of said third mixing means.

13. The synchronous receiver as claimed in claim 12, wherein said data recovery means comprises:
   third delay means for delaying said preset pseudo-noise code for a time period corresponding to one half chip of said preset pseudo noise code;
   fourth delay means for delaying an output of said third delay means during said time period corresponding to the extraction of said in-phase component of said intermediate frequency band signal by said envelope detecting means;
   fifth mixing means for multiplying an output of said fourth mixing means by an output of said fourth delay means to orthogonally-code said output of said fourth mixing means;
   means for accumulating an output of said fifth mixing means; and
   means for determining a data value by comparing, in response to said first clock signal, a value accumulated in said accumulating means with a preset value for one period of said sequence of said preset pseudo noise code, to thereby recover said input data.

14. The synchronous network of claim 9, wherein said coded spread spectrum data is delayed by a time period corresponding to one-half chip of said preset pseudo noise code prior to being modulated with said phase shifted version of said intermediate frequency band signal.

15. A transmission method, comprising the steps of:
   generating a pseudo noise code and an orthogonal code;
   receiving input data, and generating orthogonally coded spread spectrum data by band-spreading said input data in accordance with said pseudo noise code and orthogonally coding said input data in accordance with said orthogonal code;
   generating a modulated noise signal by modulating an intermediate frequency signal with said pseudo noise code;

generating a data modulated signal by modulating a phase shifted version of said intermediate frequency signal with said orthogonally coded spread spectrum data;
   generating a combined signal by combining said modulated noise signal with said data modulated signal; and
   generating a transmission signal by mixing said combined signal with a carrier wave, and transmitting said transmission signal.

16. The method as claimed in claim 15, further comprising a step of phase shifting said intermediate frequency signal by 90 degrees to generate said phase shifted version of said intermediate frequency signal.

17. The method as claimed in claim 15, further comprising a step of filtering and amplifying said orthogonally coded spread spectrum data prior to modulating said phase shifted version of said intermediate frequency signal with said orthogonally coded spread spectrum data.

18. The method as claimed in claim 15, further comprising a step of filtering and amplifying said pseudo noise code prior to modulating said intermediate frequency signal with said pseudo noise code.

19. The method as claimed in claim 18, further comprising a step of filtering and amplifying said orthogonally coded spread spectrum data prior to modulating said phase shifted version of said intermediate frequency signal with said orthogonally coded spread spectrum data.

20. The transmission method of claim 15, further comprising a step of delaying said orthogonally coded spread spectrum data by a time period corresponding to one-half chip of said pseudo noise code prior to modulating said phase shifted version of said intermediate frequency signal with said orthogonally coded spread spectrum data.

21. A data recovery method in a spread spectrum communication system, comprising the steps of:
   receiving an input signal comprised of a pseudo poise code and an intermediate frequency band signal;
   eliminating a carrier wave from said input signal to extract said intermediate frequency band signal from said input signal;
   generating first and second clock signals, said second clock signal being generated in synchronism with receipt of said pseudo noise code;
   generating an early pseudo noise code, a punctual pseudo noise code and a late pseudo noise code in dependence upon said second clock signal;
   despreading said intermediate frequency band signal using said early pseudo noise code, said punctual pseudo noise code, and said late pseudo noise code, extracting an in-phase component of said intermediate frequency band signal and detecting envelopes corresponding to said early, punctual and late pseudo noise codes;
   converting said in-phase component of said intermediate frequency band signal into a quadrature phase component of said intermediate frequency band signal, and eliminating an intermediate frequency component of said intermediate frequency band signal to extract said quadrature phase component of said intermediate frequency band signal;
   despreading said quadrature phase component of said intermediate frequency band signal using said late pseudo noise code to generate a despread quadrature phase component of said intermediate frequency band signal; and
   synchronizing said despread quadrature phase component of said intermediate frequency band signal with said first clock signal, and accumulating said despread quadrature phase component of said intermediate frequency band signal for a period of time corresponding to a sequence of said pseudo noise code to recover data received within said input signal.

22. A transmitter, comprising:

pseudo noise code generating means for generating a pseudo noise code;

orthogonal code generating means for generating an orthogonal code;

means for generating coded spread spectrum data by band-spreading input data in accordance with said pseudo noise code and orthogonally coding said input data in accordance with said orthogonal code;

delay means for delaying said coded spread spectrum data by a time period corresponding to one half chip of said pseudo noise code to generate delayed data;

first filtering means for restricting a frequency band of said pseudo noise code to a base band;

first amplifying means for amplifying an output from said first filtering means to generate a filtered amplified version of said pseudo noise code;

second filtering means for restricting a frequency band of said delayed data to said base band;

second amplifying means for amplifying an output from said second filtering means to generate a filtered amplified version of said delayed data;

means for generating an intermediate frequency signal and a phase shifted version of said intermediate frequency signal;

first mixing means for generating a modulated noise signal by multiplying said intermediate frequency signal by said filtered amplified version of said pseudo noise code;

second mixing means for generating a data modulated signal by multiplying said phase shifted version of said intermediate frequency signal by said filtered amplified version of said delayed data;

adding means for combining said modulated noise signal with said data modulated signal to generate a combined signal;

third mixing means for generating a transmission signal by multiplying said combined a signal by a carrier wave; and transmitting means for transmitting said transmission signal.

23. The transmitter of claim 22, wherein said phase shifted version of said intermediate frequency signal is comprised of said intermediate frequency signal shifted by 90 degrees.

24. A receiver, comprising:

receiving means for receiving an input signal comprised of a pseudo noise code and an intermediate frequency band signal;

extracting said intermediate frequency band signal from said input signal;

clock generating means for generating first and second clock signals, said second clock signal being generated in synchronism with receipt of said pseudo noise code;

pseudo noise code generating means for generating an early pseudo noise code, a punctual pseudo noise code and a late pseudo noise code in dependence upon said second clock signal;

envelope detecting means for extracting an in-phase component of said intermediate frequency band signal and detecting envelopes corresponding to said early, punctual and late pseudo noise codes;

clock controlling means for controlling said clock generating means in dependence upon levels of said envelopes detected;

quadrature phase extracting means for converting said in-phase component of said intermediate frequency band signal into a quadrature phase component of said intermediate frequency band signal, and extracting said quadrature phase component of said intermediate frequency band signal;

despreading means for despreading said quadrature phase component of said intermediate frequency band signal using said late pseudo noise code to generate a despread quadrature phase component of said intermediate frequency band signal; and data recovery means for synchronizing said despread quadrature phase component of said intermediate frequency band signal with said first clock signal, and for accumulating said despread quadrature phase component of said intermediate frequency band signal for a period of time corresponding to a sequence of said pseudo noise code to recover data within said input signal.

* * * * *